United States Patent Office 2,853,891
Patented Sept. 30, 1958

2,853,891

CONTROL FOR AUTOMATIC TRANSMISSION

Robert M. Tuck, Indianapolis, Ind., assignor to General Motors Corporation, Detroit, Mich., a corporation of Delaware Application May 21, 1952, Serial No. 289,115

12 Claims. (Cl. 74—754)

This invention relates to automatic transmissions, such as may be employed for the transmission of torque from the engine to the traction wheels or other traction elements of an automotive vehicle, that is, a self propelled vehicle of any sort, and it has to do particularly with a transmission of the type having frictional engaging elements which are selectively engaged and disengaged for effecting different speed ratios.

More particularly the invention is concerned with a transmission wherein the frictional engaging elements are engaged hydraulically, that is, by liquid under pressure, and with a transmission involving speed change mechanism employed with a fluid torque converter.

In such a transmission the torque output of the hydraulic torque converter varies with the speed of the input member or impeller and, therefore, the speed of the engine since the impeller is connected to the engine. In a similar manner a pump which is driven by the engine for supplying the liquid under pressure for actuating the engaging elements varies with the speed of the engine and therefore the pressure of the pumped medium varies.

An object of the invention is to provide an arrangement for regulating the pressure of the liquid which is effective to cause engagement of the friction elements. The pressure of the liquid for effecting such engagement must be high enough to insure a positive non-slipping engagement of the frictional elements but in order to produce a nicety of action with a smooth gradual engagement, the pressure of the liquid is controlled so that it preferably is not substantially higher than that necessary to produce a nicety of engagement to transmit the available torque. In accordance with the invention, a pressure regulator valve is so arranged and constructed as to provide a substantially determined or fixed low pressure at low transmission input speeds and a higher pressure under heavy throttle conditions and at higher input speeds. In this connection, a substantially minimum pressure is preferably maintained at engine idling speeds and a substantially maximum pressure at higher speeds with a gradual change between these extremes as required for operating the clutch system.

The invention also provides a system of hydraulic control wherein the actuating pressure is increased under such conditions as when the transmission is to be operated or is operated in low gear ratio and in reverse to take care of the high torque reaction.

A system constructed in accordance with the invention is disclosed in the accompanying drawings.

Figures 1, 2:
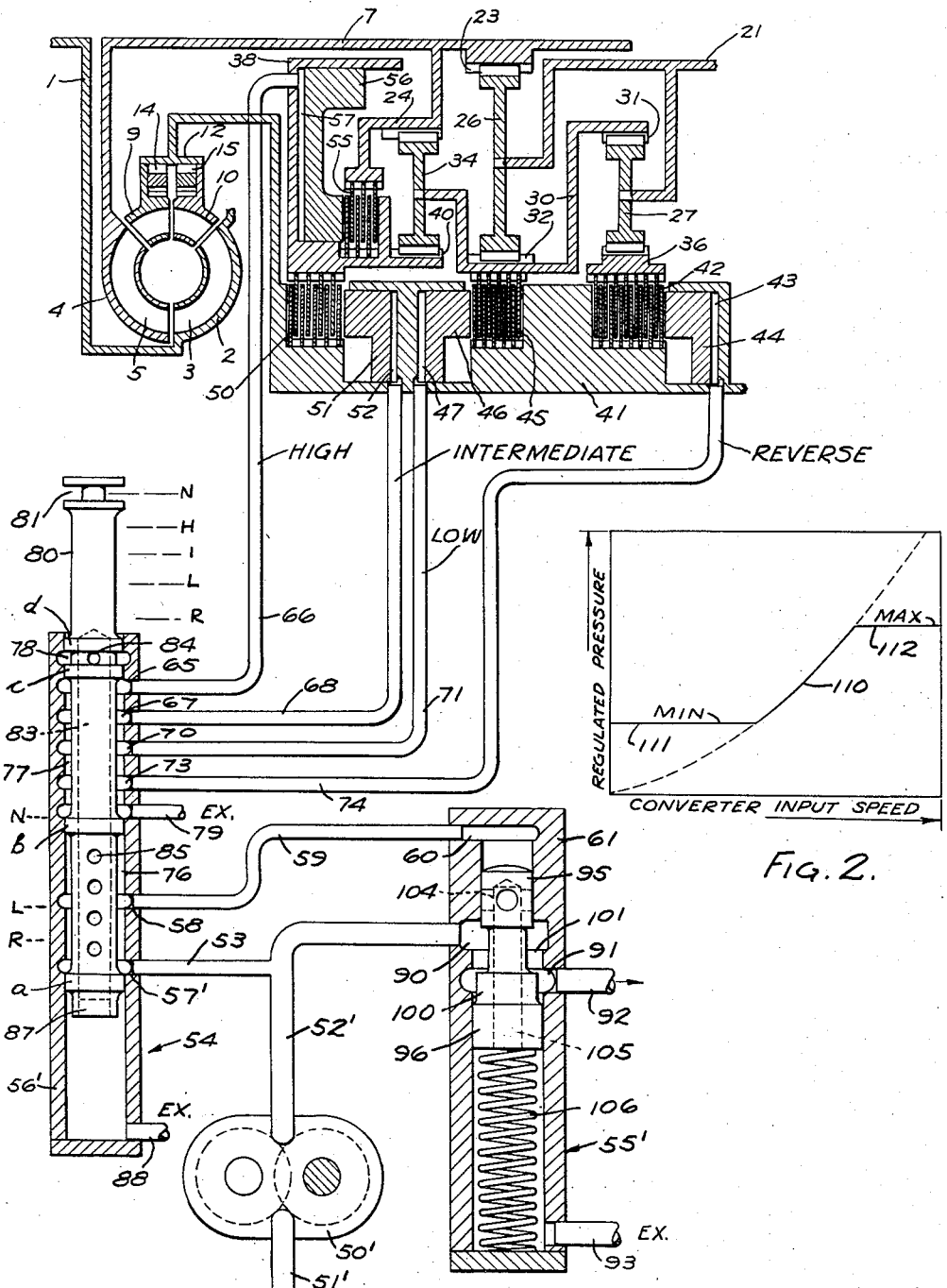
Fig. 1 is a view with parts shown in section, and illustrating diagrammatically, a transmission and torque converter, illustrating diagrammatically an engine operated pump and showing the hydraulic system and selector and pressure regulator valves.
Fig. 2 is a view illustrating the pressure curve.

The transmission, diagrammatically shown, comprises a power input member 1 which may be a part of the fly wheel of an engine. This member has a pump or impeller portion 2 provided with vanes 3. The driven member or turbine 4 has vanes 5, this driven member being connected to a member 7 which may be a shaft or sleeve. In conjunction with the impeller and the turbine are vaned stators 9 and 10, associated with a fixed element 12 as by means of one way drive couplings illustrated at 14 and 15.

These members cooperate to form the torus chamber of a torque converter in which a suitable liquid, such as an oil is maintained under pressure. Rotation of the impeller 2 causes the oil to impinge upon the blades 5 of the impeller to transmit torque to the member 7, and the function of the stator is to return the oil to the vanes of the impeller and to turn the direction of flow of the oil in such a manner as to convert the torque. Such a torque converter is well known to those versed in the art and needs no further description.

The transmission has a final output member 21 and the various gears of the system and the clutching elements are arranged to change the speed ratio between the member 7 which is the input member of the transmission and the output member 21. Secured to the member 7 is a sun gear 23 and a sun gear 24. The output member 21 is in the form of a carrier for carrying planet gears 26 and 27. A member 30 is provided with a sun gear 31, the teeth of which mesh with the planet gear 27, a ring gear 32 the teeth of which mesh with the teeth of the planet gear 26. The member 30 carries planet gear 34, the teeth of which mesh with sun gear 24. There is a ring gear 36 with which the teeth of the pinion 27 mesh, and a member 38 having an internal ring gear formation 40 with which the teeth of the pinion 34 mesh.

A housing or other fixed part is illustrated at 41 and interassociated between the ring gear 36 and the housing 41 is a friction brake generally illustrated at 42 and shown as comprising alternate clutch discs or rings connected respectively to the ring gear and the housing. The housing has a cylinder formation 43 with a piston 44 therein capable of shifting to engage the brake 42. Interassociated between the member 30 and the housing is a friction brake 45, the plates of which are arranged to be engaged by a piston 46 in a cylinder 47. A friction brake 50 is disposed between the member 38 and the housing member 41 and arranged to be engaged by a piston 51 in a cylinder 52. There is also a friction clutch 55 disposed between the sun gear member 24 and the ring gear member 38 and this clutch is arranged to be engaged by a piston 56 in cylinder 57.

In this diagrammatic view only one planetary gear of each set is shown but it is, of course, understood that several are used in each set as is well known to those versed in the art, and all the friction elements are shown to be of the disc type although other types of elements could be used.

When the clutch 55 is engaged the input member 7 and the member 21 are locked together at 1:1 ratio. This is as follows: The clutch 55 locks sun gear 24 to the ring gear element 38 so the pinion 34 does not rotate on its axis and thus the ring gear 32 and sun gear 23 and planet gear 26 rotate together without relative rotation thus driving the member 21.

When the brake 50 is engaged the transmission is in intermediate speed ratio. Engagement of the brake 50 holds the ring gear 40 fixed relative to the housing 41. The rotation of the sun gear 24 causes the pinion 34 to revolve about the ring gear 40 in the same direction but at a lower speed. The differential speeds between sun gear 23 and ring gear 32 causes the pinion 26 to revolve about the sun gear 23 and ring gear 32 thus driving the output member 21.

When the brake 45 is engaged the transmission is in low speed ratio. The ring gear 32 is held stationary and the turning of the sun gear 23 causes pinion 26 to revolve around the ring gear in the same direction but at a lower speed thus carrying the output member 21 with it.

When the brake 42 is engaged the transmission is in reverse. The sun gears 24 and 23 transmit torque into the member 30 through the respective planet pinions 34 and 26. The combined torques thus introduced into the member 30 causes sun gear 31 to rotate in a direction opposite that of the member 7 and since the ring gear 36 is held stationary the planet pinions 27 revolve about the ring gear 36 in a direction opposite that of the direction of rotation of the member 7, thus driving the output member 21 in reverse direction.

A pump 50' driven by the engine has an intake line 51' and a high pressure discharge line 52', a branch 53' of which leads to a selector valve 54. The line 52' also leads to a pressure regulator valve 55'. The body of the selector valve is illustrated at 56' and it has a port 57' for connection to the line 53 and a port 58 for connection to a line 59 which leads to a port 60 in the body 61 of the pressure regulator valve. The selector valve body has a port 65 for a line or conduit 66 leading to the cylinder 57, a port 67 for a line 68 leading to the cylinder 52, a port 70 for a line 71 leading to cylinder 47 and a port 73 for connection to a line 74 which extends to the cylinder 43.

The movable valve member has several lands as shown at *a*, *b*, *c*, and *d*, and the valve member is ensmalled in diameter between the lands *a* and *b* to provide a passage or way 76, and it is ensmalled between the lands *b* and *c* thus providing a way or passage 77. The valve is also constructed to form a passage 78 between the lands *c* and *d*. The body has an exhaust 79. The member is ensmalled also as at 80 and it may be provided with spaced heads at one end to provide a slot or groove 81 for reception of an actuating device.

This valve member is hollow for a part of its length thus providing an internal passage 83 which has a port 84 in communication with the passage 78. The valve member also has one or more ports 85 positioned between the heads *a* and *b* thus providing a communication between the passage 76 and the passage 83. The passage 83 is, of course, closed at the inner end as by means of a plug 87 or the like. As shown there are four ports 85 between the heads *a* and *b* but the number is not controlling. The valve body has an exhaust 88 for the discharge of oil which may otherwise be trapped therein.

The pressure regulator valve body has a port 90 for connection to the pressure line 52', a port 91 for connection to a discharge line 92 which conveniently may convey liquid to the torque converter to keep it supplied. The body also has an exhaust 93.

Within the body is a movable valve member having a head 95 slidably fitting in a relatively small bore in the body, and a head of larger diameter 96 slidably disposed in a relatively large bore in the body. The valve member also has an intermediate head portion 100, and between the ports 90 and 91 is a passage 101 with which the head 100 cooperates. The head portion 100 may conveniently be termed a throttling portion. The head 95 is provided with one or more ports 104 which communicate with a passage 105 extending axially through the valve member and which thus communicates into the body and to the exhaust 93. A spring 106 normally holds the movable valve member in its uppermost position in the housing 55'.

In the operation of the mechanism the selector valve is caused to be shifted. The selector valve member is shown in its uppermost position. Let it be assumed that the engine is operating and the impeller member 2 is rotating. The engine operated pump 50' delivers oil under pressure to the passage 76 of the selector valve. Oil under pressure is also delivered through the line 59 to the pressure regulator valve. For the moment, however, consider the selector valve: It is shown in neutral position and all of the cylinders of the transmission are exhausted through the passage 77 and exhaust 79.

If the selector valve is shifted from the neutral position shown at N to the high position shown at H, oil under pressure is delivered through line 53, passage 76, port 85 and passage 83, through ports 84 and 78 and line 66 to the cylinder 57, to engage the clutch 55. If the selector valve is shifted to the intermediate position shown at I, the port 78 aligns with port 67 and oil under pressure is delivered to the cylinder 52 for engaging the intermediate brake 50. At this time the cylinder 57 is exhausted or vented through the selector valve by reason of the reduced portion 80 for the disengagement of the high clutch 55. If the selector valve is shifted to the low position, as shown at L, port 78 aligns with port 70 and oil under pressure is delivered to the cylinder 47 for engaging the low brake 45. The cylinder 52 is now vented for disengagement of the intermediate brake 50.

In this position of the selector valve the head *b* lies below, as Fig. 1 is viewed, the port 58 and thus shut off the delivery of oil under pressure to the pressure regulator valve for purposes which will presently appear. If the selector valve is shifted to the reverse position as shown at R, the port 78 aligns with port 73 and oil is delivered under pressure to the cylinder 43 to engage the reverse brake 42. The cylinder 47 is vented for disengagement of the low brake 45. The valve is in its lowermost position when in reverse position. Visualizing a step by step reverse movement of the valve member the clutches are respectively engaged and released but in reverse sequence. For example, in the low position, the cylinder 43 is vented through the exhaust 79, while in the position shown all clutch cylinders are vented through the exhaust 79.

The pressure regulator valve is arranged to provide a pressure curve substantially as indicated in Fig. 2 wherein the curve 110 represents a variation due to orifice effect at different speeds of operation of the impeller and pump. The straight line function for the minimum pressure is indicated at 111 while a straight line function for the maximum pressure is at 112. In the normal at rest position, the regulator valve member is uppermost in the valve body urged in this position by the spring 106. With the engine idling, pressure is delivered through the port 60 and this pressure is effective upon the valve member in a direction opposing the spring. Pressure is also delivered through the port 90 and this pressure is additive to the pressure on the head 95 because of the differential between the land portions 95 and 96. At this time, that is, when the engine is idling, the land 96 closes or substantially closes the exhaust port 91 and the part 100 of smaller diameter lies in the passage 101. Thus, a minimum pressure is maintained as indicated by the straight line 111 of Fig. 2; otherwise the pressure would decrease somewhat as indicated by the lower dotted portion of line 110. At high speeds, as, for example, those speeds attained at full engine throttle, the maximum pressure is indicated at the line 112. The pressures delivered to the regulator valve through ports 60 and 90 overcome the spring and shift it downwardly as Fig. 1 is viewed, thus opening the port 91 widely. The valve provides a gradual increase of pressure with increase of speed as indicated by the curve 110. In this performance the part 100 of smaller diameter is gradually lowered relative to the passage 101 and ultimately when it is substantially withdrawn therefrom the maintained pressure is substantially as indicated by this line 112.

Thus when a clutch or brake is to be engaged for changing the gear ratio, at relatively low engine speeds, the pressure of the oil introduced into the cylinder for engaging the same is correspondingly relatively low to effect a smooth and gradual engagement. If the speed of the engine is high the pressure is correspondingly higher and, therefore, the clutch or brake is engaged under higher pressure and in a manner necessary to transmit the available higher torque which varies in conventional internal combustion engines generally like curve 110—112.

When the selector valve is in the low or reverse positions as above described, oil under pressure is cut off from the port 60 of the regulator valve. This has the effect of reducing the piston area of the pressure control valve member so that the only pressure delivered thereto and acting against the spring 106 is that pressure introduced directly from the pump through port 90. Thus a higher pressure is maintained in the system for actuating the friction elements when the selector valve is in low or reverse. In this way the friction elements are engaged in a manner to take care of the high torque reaction in low and reverse.

In the event the hydraulic medium is cold, to the end that it is less fluid than it is in its normal operating condition, the pressure exerted on the regulator valve is higher. This excess of pressure moves the pressure regulator valve member against the spring until the ports 104 register or partly register with the port 90, and thus the oil is discharged through ports 104, passage 105 and exhaust 93. This relieves abnormally high pressures and, of course, will function to relieve high pressures which may be caused not only by cold oil but which may be caused by any other abnormal condition.

I claim:

1. Pressure regulator means for controlling the pressure in a hydraulic control system for an automatic transmission mechanism, which comprises a pressure regulator valve body with differential sized bores therein, a spring actuated valve member with axially spaced differential sized heads in the bores, an inlet port connected into the system and communicating between the said heads, an exhaust port positioned to be substantially normally closed by the larger head, said valve member being shiftable by hydraulic pressure introduced into said inlet port, and a head portion on the valve member of intermediate size for gradually opening the exhaust port as the valve member moves incident to increase in pressure of the hydraulic medium.

2. The pressure regulator means as described in claim 1 characterized in that there is a selector valve in the system operable to condition the transmission for different speed ratios, a conduit extending from the selector valve to the regulator valve body so that the pressure of the hydraulic medium introduced through the conduit acts upon the movable valve member to shift it upon increase of pressure, and a valving part on the selector valve for closing the conduit and for exhausting the same when the selector valve is in a position for conditioning the transmission to transmit torque at a low speed ratio.

3. In an apparatus for the transmission of torque from an engine comprising in combination, a transmission with speed change gearing having a power input member to be driven by the engine and a power output member, a plurality of hydraulically operated friction engaging elements associated with the gearing, a pump for hydraulic medium driven by the engine, whereby the pressure of pumped medium varies with engine speed, a selector valve having a movable member, a conduit system including an open pressure line extending from the pump to the selector valve and conducting lines extending from the selector valve to each of the several elements, said selector valve having ports and passages for selectively establishing, in different positions of the movable member, connections between the pressure line and the conducting lines and for exhausting the non-selected conducting lines for engaging selected elements, to thereby establish different speed ratios between the input and output members, a pressure regulator valve, a conduit for hydraulic medium under pressure extending from the selector valve to the pressure regulator valve, said regulator valve having a movable member influenced and movable by the hydraulic medium and having an exhaust port, the movable member having a first position substantially closing the exhaust port in a low range of engine speeds to maintain a substantially constant minimum pressure in the system, and a second position widely opening the exhaust port in a high range of engine speeds for substantially determining the constant maximum pressure in the system, a part on the movable member throttling the exhaust port as the movable member shifts from said first to said second positions incident to increase of engine speed and pressure for effecting gradual increase of pressure in the system from minimum to maximum, and means in the selector valve for closing said conduit from hydraulic medium under pressure when the movable member of the selector valve is positioned for establishing a low speed ratio in the transmission, to thereby maintain a relatively high pressure in the system at said low speed ratio.

4. Pressure regulator valve means for controlling the pressure in a hydraulic control system for an automatic transmission mechanism, which comprises a pressure regulator valve body having a bore therein, a valve member slidable in said bore, said valve member having axially spaced heads, said body being provided with an inlet port communicating with said bore between said heads, and a spaced outlet port, a spring biasing said valve member in one direction to a position wherein one of said heads substantially closes said outlet port, a source for supplying fluid to said inlet port, said valve member being subject to fluid from said source to move said valve member against said spring to open said outlet port, means acting in said bore between said ports for gradually opening said outlet port as said valve member moves under the urging of fluid from said source, and means for reducing the effect of fluid from said source in moving said valve against said spring thereby to increase the pressure regulated by said regulator valve means.

5. In an apparatus for the transmission of torque from an engine comprising in combination, a transmission with speed change gearing having a power input member to be driven by the engine and a power output member, a plurality of hydraulically operated friction engaging elements associated with the gearing, a pump for hydraulic medium driven by the engine, whereby the pressure of pumped medium varies with engine speed, a selector valve having a movable member, a conduit system including an open pressure line extending from the pump to the selector valve and conducting lines extending from the selector valve to each of the several elements, said selector valve having ports and passages for selectively establishing, in different positions of the movable member, connections between the pressure line and the conducting lines and for exhausting the non-selected conducting lines for engaging selected elements, to thereby establish different speed ratios between the input and output members, a pressure regulator valve, a conduit for hydraulic medium under pressure extending to the pressure regulator valve, said regulator valve having a movable member influenced and movable by the hydraulic medium and having an exhaust port, the movable member substantially closing the connection between the said conduit and the exhaust port at low engine speeds to maintain a minimum pressure in the system, and widely opening the connection between the said conduit and the exhaust port at high engine speeds for substantially determining the maximum pressure in the system, a part on the movable member shiftable relative to and for variably throttling the connection between the said conduit and the exhaust port as the movable member shifts incident to increase of engine speed and pressure for effecting gradual increase of pressure in the system from the minimum to the maximum, a second conduit extending from the selector valve to the pressure regulator valve for conducting medium under pressure so that the pressure thereof is active upon the movable member of the regulator valve, and means on the movable member of the selector valve for closing said second conduit to medium under pressure when the movable member of the selector valve is in a position for establishing a low speed ratio in the transmission.

6. In an apparatus for the transmission of torque from an engine which provides available torque increasing with engine speed in a first and second range of engine speed and leveling off in a third range of engine speed to a power output member, a transmission unit having a drive engaged by fluid operated means capable of transmitting increased torque with increasing fluid pressure, a source of fluid under pressure providing increasing output volume in a low, intermediate and high range with increasing engine speed in said respective first, second and third ranges, means to operatively connect said source to said fluid operated means to engage said drive, regulator valve means including a body having a bore with an inlet connected to said source and an outlet spaced from said inlet, and a valve member slidably positioned in said bore having means responsive to the pressure of said source urging said valve member in a direction from said inlet to said outlet, biasing means urging said valve member in the opposite direction for sequential movement from a fourth position to a substantially immediately adjacent third position, through a substantial distance in a range of intermediate positions to a second position and to a substantially immediately adjacent first position and exerting progressively less force from said fourth to said first position, said valve member and bore having first flow control means operative in said first valve member position to block flow between said inlet and outlet, second flow control means operative in said second position and said third position and the range of intermediate positions therebetween of said valve member to provide a restricted passage for flow from said inlet to outlet, and third flow control means operative in said fourth valve member position to permit free flow from said inlet to outlet, said valve member on the supply of said low volume of fluid operating between said first position and said second position to regulate the pressure of said source at a constant low value, and on the supply of said intermediate volume of fluid which will not flow through said restricted passage at said constant low pressure value moving through said range of intermediate positions to regulate the pressure of said source at increasing pressures proportional to the output volume of said source and on the supply of a high volume of fluid operating between said third position and said fourth position to regulate the pressure of said source at a constant high value to provide a pressure that varies, above a predetermined minimum, substantially with available torque of the engine.

7. The invention defined in claim 6 and said flow control means comprising a large land fitting said bore to close said bore in said first position, a small land located in said bore throughout said range of intermediate positions to provide said restricted passage, and said small land having a terminal end which is removed from said bore in said fourth position.

8. A regulated fluid pressure supply system for a variable speed mechanism, which comprises a source of fluid pressure providing an increasing output volume of fluid with increasing speed of the mechanism, a pressure regulator valve body having a bore therein having a control portion, said body being provided with an inlet port connected to said source and communicating with one end of said control portion and an outlet port communicating with the other end of said control portion, a valve member movable in said bore sequentially from a first, to a second and to a third range of positions, said valve member having greater movement in said second range than in said first and third range, said valve member having a small land providing a restricted passage through said control portion and a large land closing said control portion between said inlet and outlet ports, said small and large lands being located on said valve member to operate, in said first range of positions, with said large or small land in said bore to respectively close or provide a restricted passage through said control portion, and to operate, in a second range of position, with said small land in said bore to provide a restricted passage through said control portion and to operate, in a third range of position, with said small land in or out of said bore to provide a restricted or a free passage through said control portion, the rate of change of the size of said passage being less in said second range of positions, said valve member having an unbalanced area acted on by fluid from said inlet port to move said valve member in one direction, biasing means urging said valve member in the opposite direction from said third to said first range of positions with a force decreasing from said first to said third range of positions, in a first range of low output volume, said fluid at a constant low pressure and said spring, acting on said valve in said first range of positions to move said valve from said closed position to open said restricted passage in said control portion to exhaust excess fluid from said inlet port to said outlet port to regulate the pressure at said substantially constant low pressure value and said restricted passage being sufficiently large to bypass the excess fluid to said outlet port, in a second range of intermediate output volume said fluid and spring positioning said valve in said second range of positions providing said restricted passage of insufficient size to bypass the fluid through said restricted passage between said inlet and outlet ports causing the pressure in said inlet to rise proportional to increasing output volume, in a third range of high output volume said fluid and spring positioning said valve in said third range of positions to provide said restricted or fully open passage to regulate the fluid pressure in said inlet port at a substantially constant high value.

9. A regulated fluid pressure supply system for a variable speed mechanism, which comprises a source of fluid under pressure providing an increasing output volume with increasing speed of the mechanism, a regulating valve having a body with a bore, said body having an inlet port connecting said source to said bore and an outlet port connecting said bore to exhaust, a valve member having a large land closing said bore and a small land providing a restricted passage through said bore movable in said bore from a first position, through a first, second and third range of positions, means responsive to the fluid pressure of said source in low, intermediate and high pressure ranges to move said valve member respectively in said first, second and third range of positions, means to bias said valve member with decreasing force from said third to said first range of positions, said valve member having said lands located to operate, in said first range of positions, between a position with said large land closing said bore and a position with said small land providing said restricted passage through said bore, on small movement of said valve member to control the flow from said inlet to said outlet port to regulate the pressure of said source at a substantially constant low pressure value during a low volume output range, to operate throughout said second range of positions locating said small land to maintain said restricted passage through said bore during a relatively large movement of said valve member to control the flow from said inlet to said outlet ports to regulate the pressure of said source at increasing pressures proportional to the increasing output volume of said source during an intermediate volume output range, and to operate in said third range of positions between a position with said small land in said bore to provide said restricted passage and a position with said small land withdrawn from said bore to open an unrestricted passage on small movement of said valve member to control the flow from said inlet to outlet ports to regulate the pressure of said source at a substantially constant high pressure value during a high volume output range.

10. The invention defined in claim 9 and said valve body having a second exhaust, said valve member having means connecting said inlet port to said second exhaust in a fourth range of positions to provide relief for abnormally high pressures.

11. The invention defined in claim 9 and said valve body having a second exhaust passage continuously connected to said bore beyond said valve member, said valve member having a land slidable in said bore, a port in said land closed by said bore in said first, second and third range of positions and being located in said inlet port in a fourth range of positions, and means connecting said port in said land to the end of said valve member adjacent said second exhaust port to provide relief for abnormally high pressures in said fourth range of positions.

12. The invention defined in claim 6 and said drive unit of said transmission providing a plurality of drive ratios, control means to connect said source to said fluid operated means to select each of said drive ratios and including means operative in a drive ratio to vary said biasing means to provide for regulation in said first, second and third ranges of engine speed at a different pressure level.

References Cited in the file of this patent

UNITED STATES PATENTS

| | | |
|---|---|---|
| 2,120,104 | Livermore | June 7, 1938 |
| 2,161,008 | Bonn | June 6, 1939 |
| 2,223,716 | Bojesen | Dec. 3, 1940 |
| 2,493,111 | Courtot | Jan. 3, 1950 |
| 2,548,208 | Evernden | Apr. 10, 1951 |
| 2,649,737 | Hoen et al. | Aug. 25, 1953 |
| 2,674,191 | Ifield | Apr. 6, 1954 |
| 2,675,102 | Robinson | Apr. 13, 1954 |
| 2,693,711 | Kelbel et al. | Nov. 9, 1954 |
| 2,720,124 | Polomski | Oct. 11, 1955 |